United States Patent [19]

Kira et al.

[11] Patent Number: 4,639,806
[45] Date of Patent: Jan. 27, 1987

[54] THIN FILM MAGNETIC HEAD HAVING A MAGNETIZED FERROMAGNETIC FILM ON THE MR ELEMENT

[75] Inventors: Toru Kira, Tenri; Teiichi Miyauchi, Nara; Mitsuhiko Yoshikawa, Ikoma, all of Japan

[73] Assignee: Sharp Kabushiki Kaisha, Osaka, Japan

[21] Appl. No.: 577,389

[22] Filed: Feb. 6, 1984

[30] Foreign Application Priority Data

Sep. 9, 1983 [JP] Japan .................. 58-167312
Nov. 30, 1983 [JP] Japan .................. 58-228125

[51] Int. Cl.$^4$ .................. G11B 5/127; G01R 33/02
[52] U.S. Cl. .................. 360/113; 338/32 R; 324/252
[58] Field of Search ............. 360/113, 125; 338/32 R; 324/252

[56] References Cited

U.S. PATENT DOCUMENTS 4,354,212 10/1982 Nouchi et al. .................. 360/113

FOREIGN PATENT DOCUMENTS 2422927 1/1975 Fed. Rep. of Germany ...... 360/113
0004727 1/1980 Japan .................. 360/113
0114121 9/1981 Japan .................. 360/113
0167115 10/1982 Japan .................. 360/113

Primary Examiner—John H. Wolff
Assistant Examiner—Andrew L. Sniezek
Attorney, Agent, or Firm—Birch, Stewart, Kolasch & Birch

[57] ABSTRACT

A thin film magnetic head for detecting, as a change in electric resistance, a change in signal magnetic field to be applied along the magnetization-hard-axis direction of a metal ferromagnetic thin film (MR element) having unit-axis anisotropy, which comprises a ferromagnetic film, which is sufficiently larger in coercive force than the metal ferromagnetic thin film, the ferromagnetic film being disposed on a superposed portion between a lead conductor portion and the metal ferromagnetic thin film (MR element), the metal ferromagnetic thin film (MR element) being coupled in ferromagnetic exchange (MR element) to the ferromagnetic film which is larger in coercive force. The ferromagnetic film is magnetized in a direction longitudinally of the MR element.

2 Claims, 22 Drawing Figures

THIN FILM MAGNETIC HEAD HAVING A MAGNETIZED FERROMAGNETIC FILM ON THE MR ELEMENT

The present invention relates to a thin film magnetic head, utilizing the magnetoresistive effect of the ferromagnetic thin film made of permalloy or the like, for detecting signals recorded on a magnetic recording medium.

More particularly, the present invention relates to an improvement in construction of a thin film magnetic head (hereinafter referred to as thin film MR head), comprising a magnetoresistive element (hereinafter referred to as MR element) adapted to detect, as a change in electric resistance along a magnetization-easy-axis direction, a change in signal magnetic field applied along the magnetization-hard-axis direction of a metallic ferromagnetic thin film having a uni-axial magnetic anisotropy thereby to detect the signal magnetic field recorded on the magnetic recording medium.

Conventionally, the thin film MR head is known to have many advantages as compared with a inductive type of bulk magnetic head. Namely, the thin film MR head senses magnetic flux proportionally, because the magnetizing direction within the MR element changes due to the signal magnetic field recorded on the magnetic recording medium such as magnetic tape or the like, and the resistance of the MR element changes correspondingly, and the changes in the resistance of the MR element can be drawn out as a signal output voltage. Accordingly, the signal magnetic field can be reproduced independently of the speed of movement of the magnetic recording medium. The thin film MR head has a bright future as a magnetic reproducing head for a stationary head PCM recorder wherein high density recording is performed, because higher integration, multiple elements can be facilitated because of the minute working art of the semiconductor.

As the MR element shows a response characteristic which has a square curve with respect to the external magnetic field, it is required to prepare the MR element in the form of a stripe for the stabilization of the magnetization orientation and to apply the bias magnetic field upon the MR element for the provision of the linear response characteristics when the MR element is constructed as a reproducing head. In addition, to provide the MR element with high resolution, it is required to form, as a magnetic shield layer, a thin film made of soft magnetic material such as, for example, permalloy and sendust, on the upper and lower sides of the stripe-shaped MR element through an insulating layer.

Figure 1:
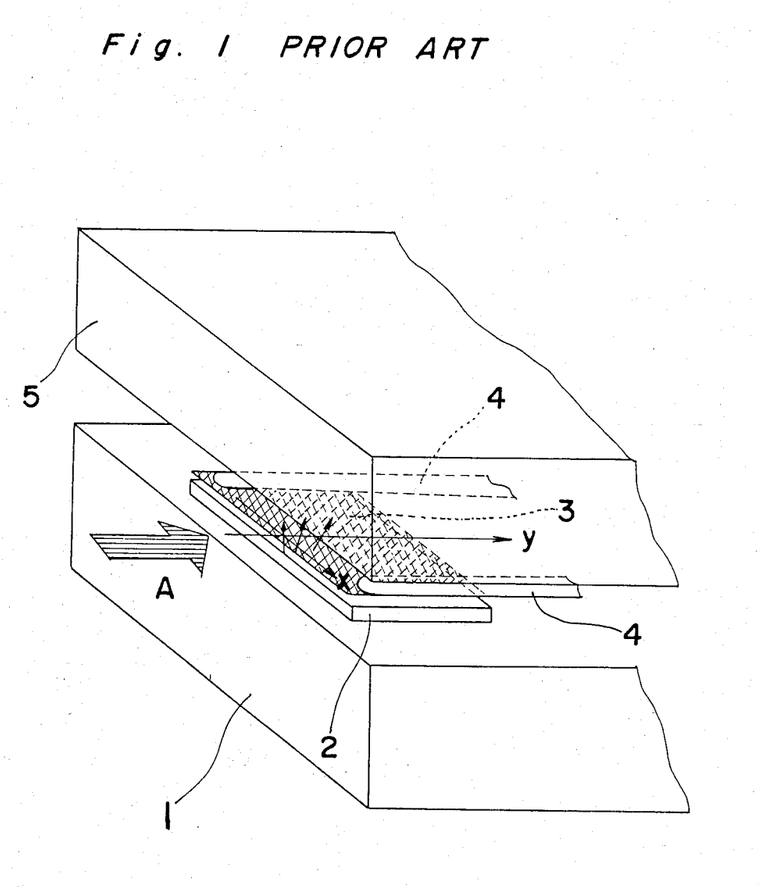
FIG. 1 is a perspective view of the conventional thin film MR head.

FIG. 1 is a perspective view of the conventional MR head, wherein 1 is a high-permeability magnetic material for use as a magnetic shield, 2 is a permanent magnet for bias use, 3 is an MR element, 4 is a conductor portion, which is the lead of the MR element 3, and 5 is a high-permeability use as a magnetic material for magnetic shield. In the head shown in FIG. 1, the magnetic field (arrow A) penetrated from the front of the gap is applied upon the MR element 3 to magnetize the MR element 3.

If the angle, formed by the magnetizing direction within the MR element 3 and the stripe longitudinal direction (X axis) of the MR element 3, is $\theta$ (Y), and the resistivity of the MR element $\rho(y)$ is as follows.

$$\rho(y) = \rho 0 + \Delta\rho max \cdot \cos^2\theta$$

($\rho 0$: resistivity of the MR element at zero-magnetic field, $\Delta\rho max$: maximum change in the resistivity of the MR element)

The resistance R of the MR element 3 becomes as follows.

$$R = \frac{v}{t} \left[ \int_0^w dy \frac{1}{\rho(Y)} \right]^{-1}$$

wherein v is the track width, t is the MR element film thickness and, w is the MR element width. Although the magnetization on the MR element 3 has an interaction with the magnetization within the magnetic shields 1 and 5, the signal output of the MR element depends on the direction of magnetization of the MR element in any case.

Figure 2:
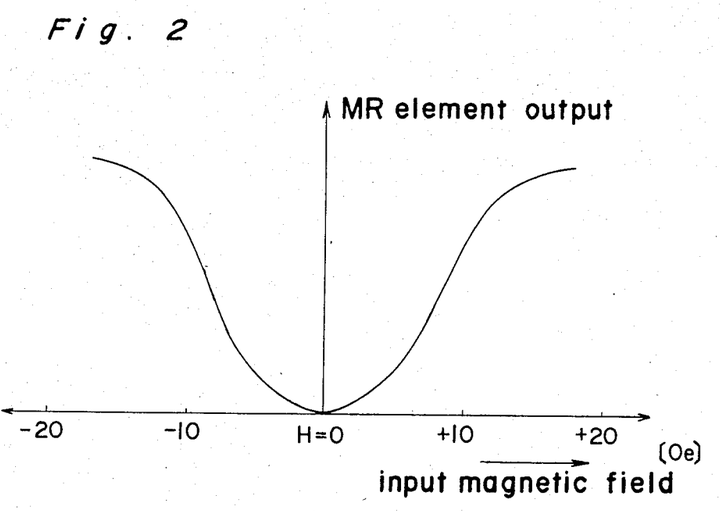
FIG. 2 is a graph showing the response characteristics of an ideal MR head.

As the MR element 3 is arranged so that the direction of the input magnetic field may coincide with the direction of the magnetization-hard-axis, My (magnetization in Y direction) becomes a linear function of Hy (magnetic field in Y direction), in an ideal case wherein the direction of the magnetization of the MR element 3 changes with a rotary mode, with the result that the output of the MR element 3 changes with a quadratic function with respect to the input magnetic field. This condition is shown in FIG. 2. The output of the MR element 3 is saturated due to the saturation of My in the high magnetic field.

Figure 3:
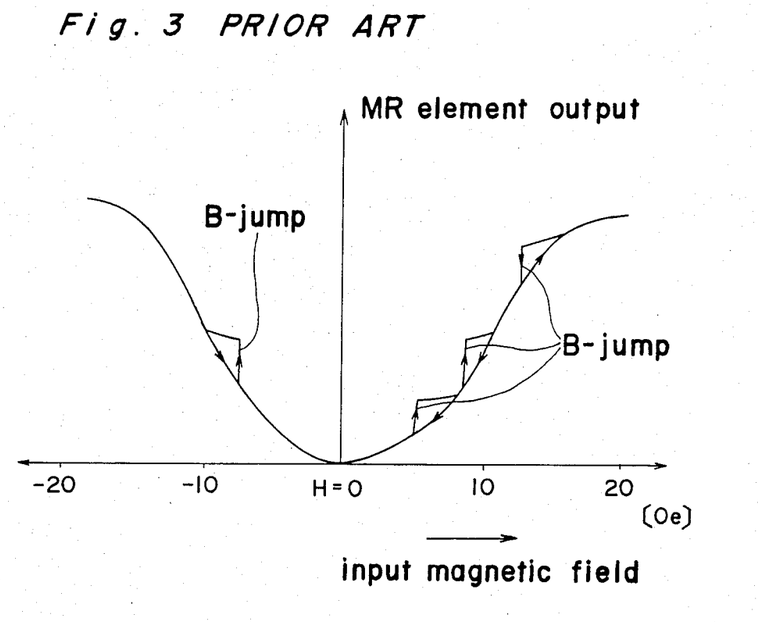
FIG. 3 is a graph showing the response characteristics of an MR head wherein B-jump is produced in the actual head.

The output of the ideal MR element is described hereinabove. In the actual element, My does not change only with the rotary mode. The magnetic-domain split is caused within the MR element and the motion of the magnetic domain is often accompanied. Particularly when the track width of the MR element of FIG. 1 becomes smaller, the change in My becomes considerable due to the motion of the magnetic domain from the relationship of the static magnetic energy. The motion of the magnetic domain accompanies the discontinuous change in My which is called Bark-hausen-jump (hereinafter referred to as B-jump). The relationship between the output of the MR element and the input magnetic field in the case where there are both the rotation of the magnetization and the motion of the magnetic domain in the MR element is shown in FIG. 3. The B-jump becomes noises of the reproduction output and considerably deteriorates the S/N ratio of the MR head. Accordingly, to provide the superior MR head, it is indispensable to suppress the B-jump of the MR element.

Figure 4:
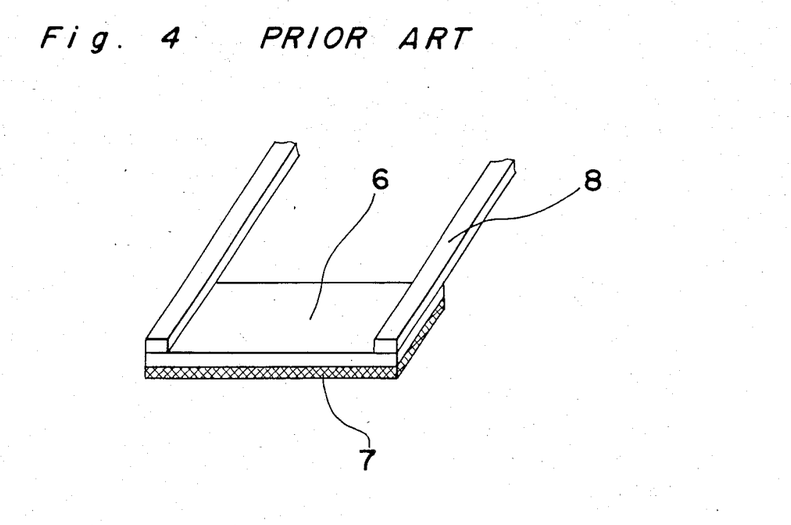
FIG. 4 is a perspective view of the head construction wherein the B-jump is suppressed by the use of the conventional anti-ferromagnetic coupling.

To suppress the B-jump, it has been conventionally known that the weak magnetic field is required to be applied along the easy-axis direction (stripe longitudinal direction) of the MR element to put the MR element into a single magnetic domain condition. And there has been proposed (1) the application by the head external coils, (2) the application by the head external permanent magnet, (3) the application by the anti-ferromagnetic thin film coupling between the MR element and the anti-ferromagnetic thin film, or the like as a method of applying a magnetic field along the easy-axis direction. FIG. 4 shows the head construction using the above-described method (3). In FIG. 4, 6 is an MR element, 7 is an anti-ferromagnetic material thin film, and 8 is a conductor portion.

However, the above-described methods (1) and (2) have disadvantages in that restriction is imposed on the casing, etc., of the head due to the magnetic field applying means provided externally of the head, and since the applied magnetic field changes in size through the position of the individual head located within the head case in the case of the multitrack head, and since the MR head of a shield model of FIG. 1 cannot be used, because the applied magnetic field does not penetrate sufficiently into the shield. Method (3), which is free from the disadvantages inherent in methods (1) and (2), has the following disadvantages. Namely, the anti-ferromagnetic film 7 is coupled to the MR element 6 so that the magnetic field is applied along the easy-axis direction of the MR element, but the magnetic characteristics of the MR element are deteriorated. Namely, the coercive force Hc and the anisotropic magnetic field HR of the MR element film are increased by the anti-ferromagnetic film 7. This adversely affects the characteristics of the head. Also, the thin film of the FeMn used as the anti-ferromagnetic film 7, but the FeMn thin film is electrically conductive. Thus, the current which flows from the lead 8, shunts not only to the MR element 6, but also to the anti-ferromagnetic material 7, thus deteriorating the sensitivity as the head.

The present invention has been developed with a view to substantially eliminating the above-described disadvantages in the conventional art and has for its object to form a ferromagnetic material, which is large in coercive force, on a portion under the lead of the MR element to apply the weak magnetic field along the stripe longitudinal direction of the MR element through the ferromagnetic coupling between the ferromagnetic material and the MR element thereby to suppress the B-jump of the MR element so that the MR head of superior S/N ratio may be realized.

According to one aspect of the present invention, a thin film magnetic head which is adapted to detect, as a change in electric resistance, a change in signal magnetic field to be applied along the magnetization-hard-axis direction of a metal ferromagnetic thin film (MR element) having uni-axis anisotropy, characterized in that a ferromagnetic film, which is sufficiently larger in coercive force than said metal ferromagnetic thin film (MR element), is arranged on the superposed portion between a lead conductor portion of the MR element and said metal ferromagnetic thin film (MR element). The metal ferromagnetic thin film is coupled in ferromagnetic exchange to said ferromagnetic film larger in coercive force.

According to another aspect of the present invention, a thin film magnetic head wherein a plurality of band-shaped high coercive ferromagnetic thin films are deposited on the surface of a rectangular magnetoresistive element in parallel to each other so as to extend diagonal to the longitudinal direction of the MR element.

These and other objects and features of the present invention will become apparent from the following description taken in conjunction with preferred embodiments with reference to the accompanying drawings, in which:

One embodiment of the MR head in accordance with the present invention will now be described in detail hereinafter with reference to FIGS. 5 to 10.

Figure 5:
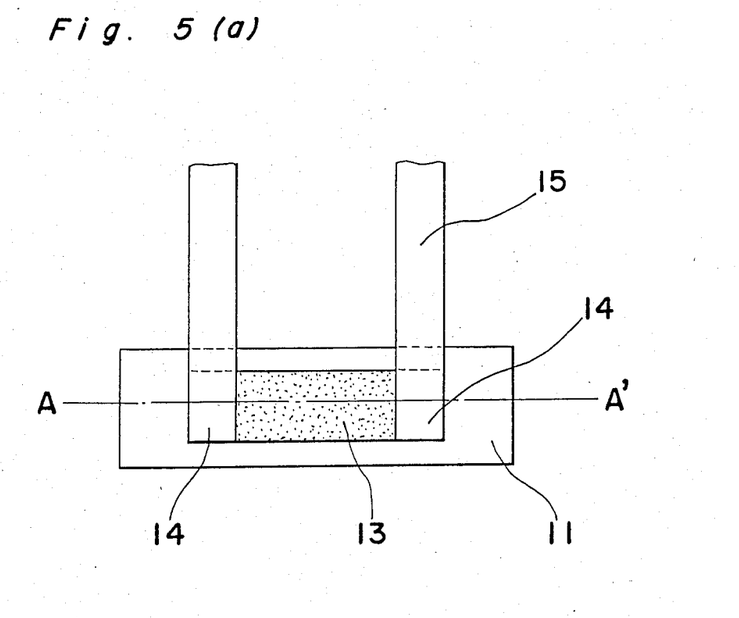
FIGS. 5a–c are diagrams showing the head construction according to one embodiment of the present invention.
Figure 5B:
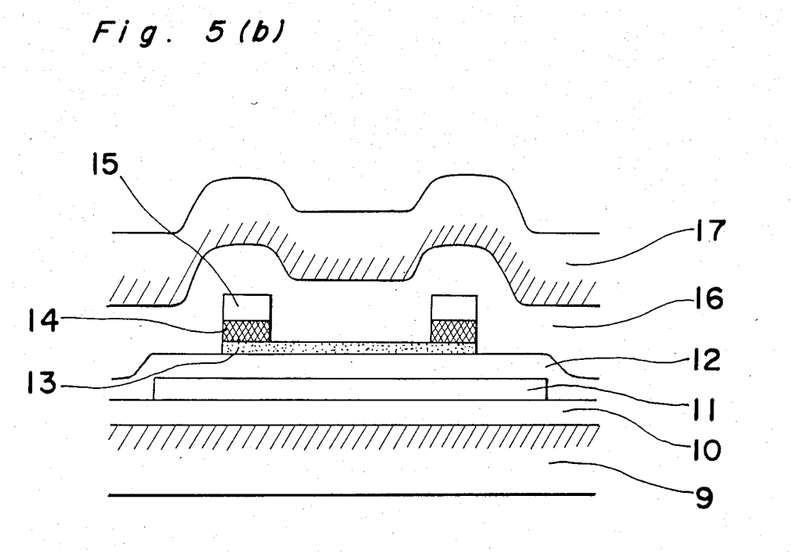
Figure 5C:
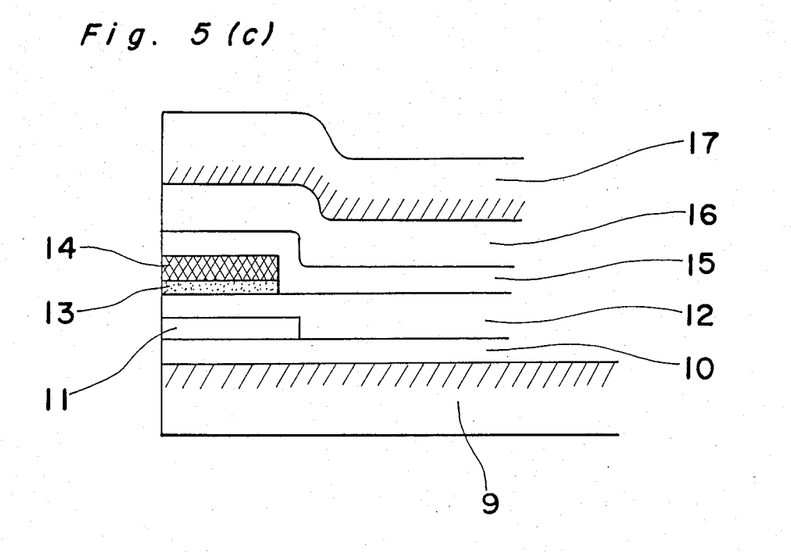
Figure 6A:
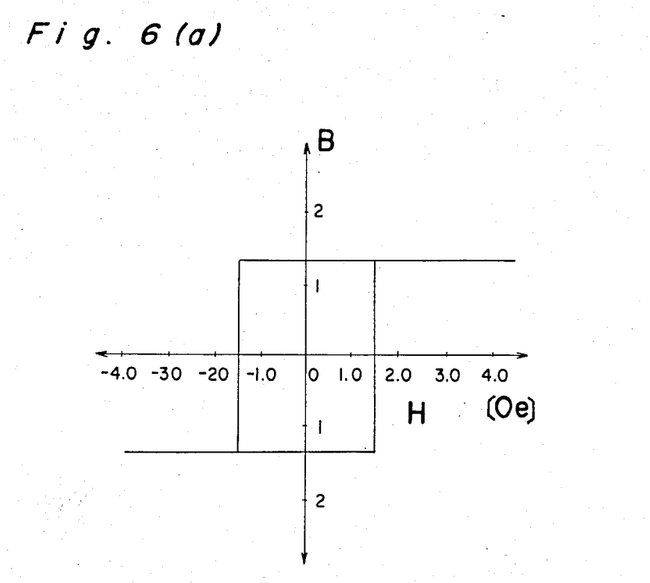
FIGS. 6a–c are B-H characteristic graphs of a composite film coupled in ferromagnetic exchange.
Figure 6B:
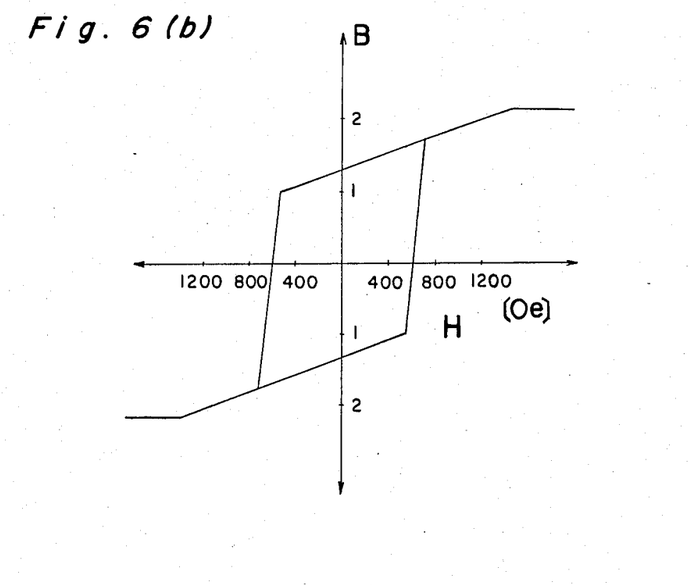
Figure 6C:
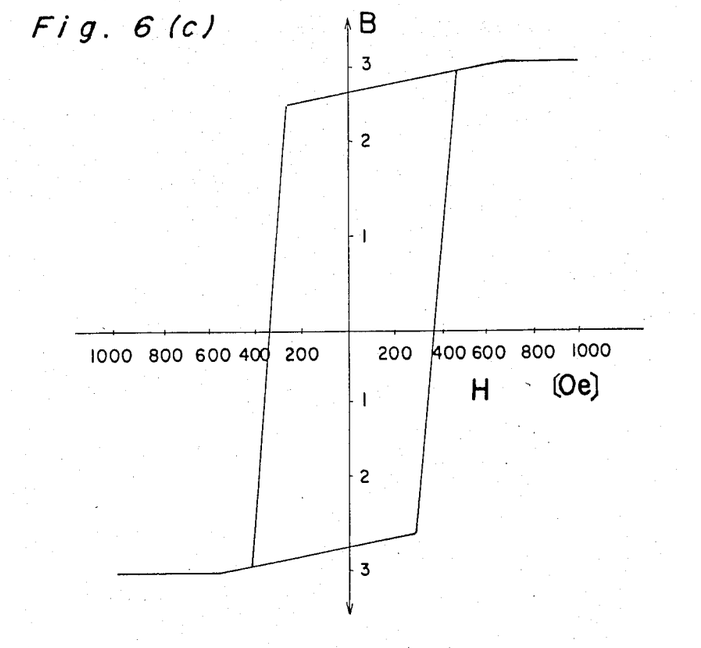
Figure 7:
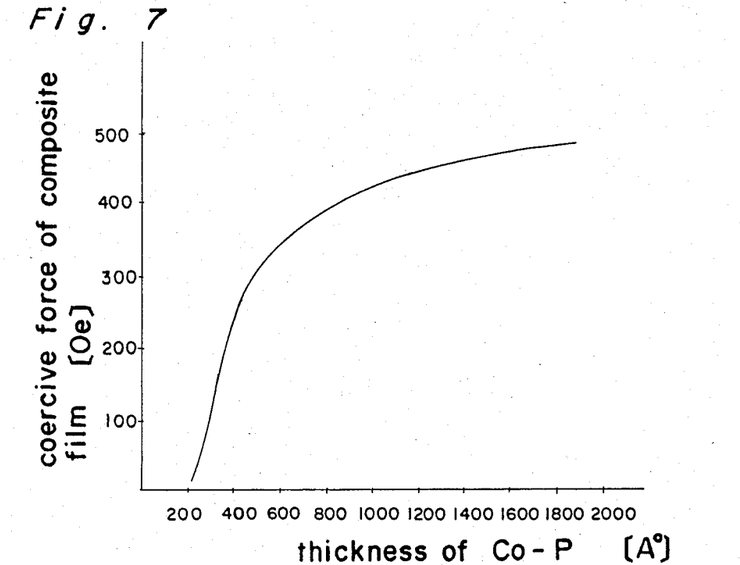
FIG. 7 is a graph of the coercive force of the composite film coupled in ferromagnetic exchange.

FIG. 5 shows the construction of the thin film MR head in accordance with the present invention. FIG. 5(a) being a plan view, FIG. 5(b) being a front cross-sectional view taken along the line A—A' in FIG. 5(a), and FIG. 5(c) being a side cross-sectional view. In these figures, 9 and 17 show a magnetic thin film of high permeability (normally, Ni-Zn ferrite, Mn-Zn ferrite, sendust and permalloy were used) which functions as a magnetic shield. 10, 12 and 16 show an interlayer insulating material ($SiO_2$, $SiN$, $Al_2O_3$, etc.), 11 is a thin film for bias use, 13 is an MR element (Ni-Fe, Ni-Co, etc.), 15 is a conductor thin film (Al, Cu, Au, etc.) which functions as the lead of the MR element 13, and 14 is a ferromagnetic thin film (Ni-Co, Ni-Co-P, Co-P, $Fe_2O_5$, etc.) which is large in coercive force and is coupled in ferromagnetic exchange to the MR element 13. When a film, which is small (approximately 1 through 10 (Oe) in coercive force, like the MR element and a film, which is larger (approximately 300 through 3K (Oe)) in coercive force, like the Co-P, are laminated, the magnetic characteristics of the composite film do not come to the total of two-layer film characteristics simply by the mutual interaction of the two-layer film, but are different from each other by the ferromagnetic exchange coupling of two-layer boundary. This condition is shown in FIG. 6. FIG. 6(a) shows the B-H characteristics of the magnetization-easy-axis direction of the Ni-Fe single film (film thickness of approximately 500 Å) for the MR element use, and FIG. 6(b) shows the B-H characteristics of Co-P plated single film (film thickness of approximately 800 Å). Also, FIG. 6(c) shows the characteristics of the composite film wherein the plated Co-P single film of FIG. 6(b) is laminated upon the Ni-Fe film of FIG. 6(a). As apparent from FIG. 6(c), the magnetizing direction of the two-layer film coincides with each other due to the exchange mutual interaction of the two-layer film boundary in the ferromagnetic exchange coupled two-layer composite-film of proper film thickness, with the result that the angular ratio and the coercive force become an intermediate value between two films. The coercive force of the composite film in the case where the Co-P plated film, which has a different thickness, is laminated on the evaporation film of Ni-Fe (80–20) of 500 Å as one example is shown in FIG. 7. It is found that the two-layer composite film of the Co-P behaves like a single film large in coercive force in the Co-P film thickness of 400 Å or more. Speaking differently, the magnetizing direction of the magnetic film (Ni-Fe film), which is smaller in coercive force, can be considered fixed in the magnetizing direction of the magnetic film (Co-P film) which is larger in the coercive force.

Figure 8:
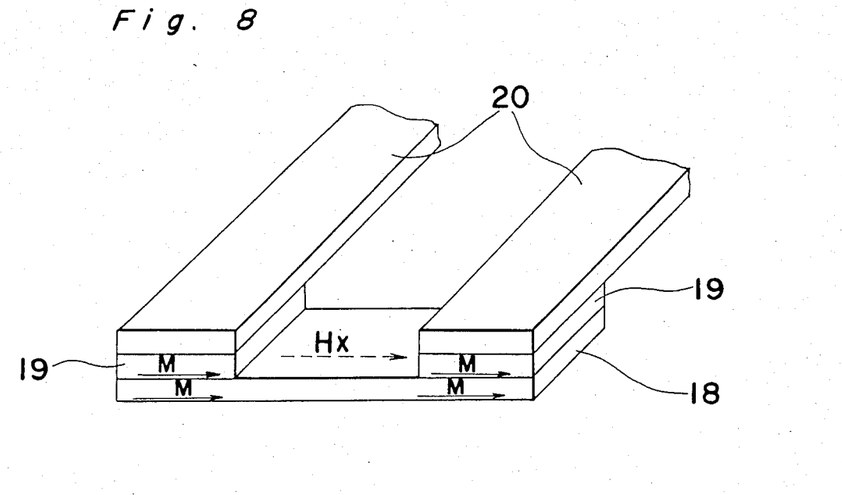
FIG. 8 is a conceptional view illustrating the B-jump suppress mechanism in accordance with the present invention.

In FIG. 5, the portion of the MR element under the lead is in the form of a ferromagnetic-exchange-coupled composite film. Thus, the magnetizing direction within the portion of the MR element under the lead can be fixed in the magnetizing direction of the ferromagnetic material 14 of FIG. 5. The magnetizing direction of the ferromagnetic material 14 of FIG. 5 can be controlled by the magnetization through the application of an external magnetic field of approximately 10 KOe. Accordingly, the magnetic field of approximately 10 KOe can be applied along the stripe longitudinal direction of the MR element in FIG. 5 to arrange the magnetizing direction within the portion of the MR element, under the lead, and the ferromagnetic film 14 along the longitudinal direction. This condition is shown in FIG. 8. However, in FIG. 8, the thin film for magnetic shield and bias is omitted. In FIG. 8, 18 is an MR element, and 19 is a ferromagnetic film which is large in coercive force, 20 is a lead. The arrow shown by M shows the magnetizing direction of each portion of the magnetic film. The portion of the MR element 18, which actually responds to the magnetic field, i.e., the portion between the lead 20 and the lead 20 directly combines with the ends (namely, the portion of the MR element 18 under the lead and the ferromagnetic film 19) of the MR element 18 so that the magnetic field Hx is applied in the longitudinal direction of the MR element 18. The MR element is put into a single magnetic-domain condition by the magnetic field Hx of the longitudinal direction of the MR element 18 so that the B-jump can be suppressed. Also, the value of this magnetic field Hx can be adjusted by controlling the film thickness of the ferromagnetic film 19 or the residual magnetization of the ferromagnetic film 19 as shown in FIG. 7. Also, since the portion of the MR element 18 by which the signal magnetic field is sensed is not different from the ordinary MR element, there is no possibility of the MR characteristics deteriorating and no possibility of the sensitivity of the head being decreased so that the present invention is superior in the point to the conventional method of using the anti-ferromagnetic coupling. Also, since the ferromagnetic film 19 for applying the magnetic field, Hx is coupled directly to the MR element, the rate at which the applied magnetic field is damped even in the shields is lower, so that the present invention is superior in this point to a method of applying the magnetic field by the external coil or the external coil permanent magnet.

Now, one example of the method of manufacturing the thin film MR head described hereinabove will be described. It is to be noted that the method of making the shield layers 9 and 17, thin film 11 for bias, etc., will be omitted because it is the same as that of the conventional art, with the exception of the detailed description of the MR element only. At first, Ni-Fe film (MR) is deposited to the thickness of 200 to 1000 Å, in the uniform magnetic field, by a sputtering method or an evaporating method on the substrate, thereafter photoresist is coated thereof for mask adjustment, and exposure and development is performed for the treatment into stripe shape. Thereafter, the exposed portion of the Ni-Fe film with the resist layer as the mask is removed by etching. The MR element 13 is formed by this process. Then, after the resist on the Ni-Fe film (13) has been removed, the new resist is coated again thereon to remove the resist of the portion where the MR element 13 is placed upon the conductor portion 15 thereby to make a window. Thereafter, the substrate is put into the electroless plating liquid of Co-P or Ni-Co-P to perform the selective plating of the Co-P (or Ni-Co-P) for forming, on the MR element 13, the thin film (14) of Co-P (or Ni-Co-P) for approximately 500 Å to 3000 Å. Thereafter, the resist is removed. Then, Al is evaporated on the entire face to perform the photoetching operation by an etching means, which has a selection property with respect to Ni-Fe, Co-P, etc., thereby to form the conductor portion 15, whereby the MR element is completed.

Finally, to fix the magnetization within the portion of the Ni-Fe film under the Co-P thin film (14) and the Co-P thin film in the longitudinal direction of the Ni-Fe film (13), the magnetic field of approximately 10 KOe is applied in that direction for magnetization.

Figure 9A:
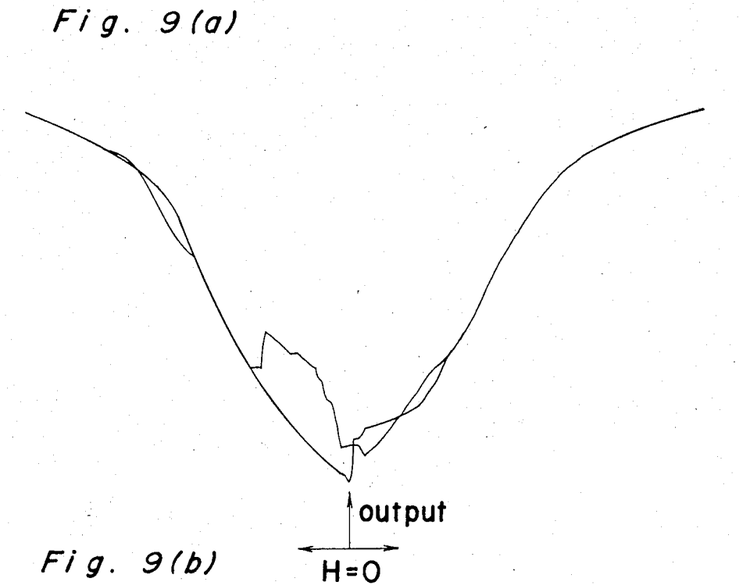
FIGS. 9a–b are a characteristic graph of an MR head.
Figure 9B:
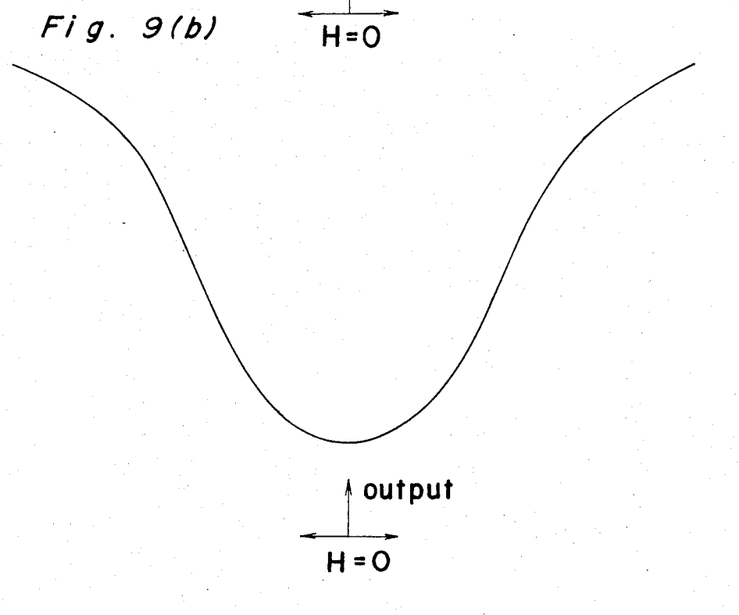

One example of the output characteristics of the MR head made by the above-described processes is shown in FIG. 9. FIG. 9(a) shows the measured characteristics of the output of the MR head of the conventional construction, and FIG. 9(b) shows the above described construction of the present invention. According to FIG. 9(b), the B-jump is completely suppressed. The stripe width of the MR head of the characteristics shown therein is $10\mu$, the track width is $50\mu$, and the width of the lead is $20\mu$. In the case of the conventional MR head, the magnetic domain split is violent and the B-jump often occurs as the track width becomes narrower, and the stripe width becomes wider, i.e., as the ratio (referred to as aspect ratio) between the length and breadth of the stripe of the MR element becomes smaller. But in the case of the construction of the present invention, the magnetic field (Hx) along the stripe longitudinal direction for the B-jump suppressing is strongly applied as the aspect ratio is smaller, so that the B-jump can be strongly suppressed. Accordingly, the suppressing effect on the B-jump could be confirmed in the wide shape range except for the said stripe size of the MR head.

Figure 10:
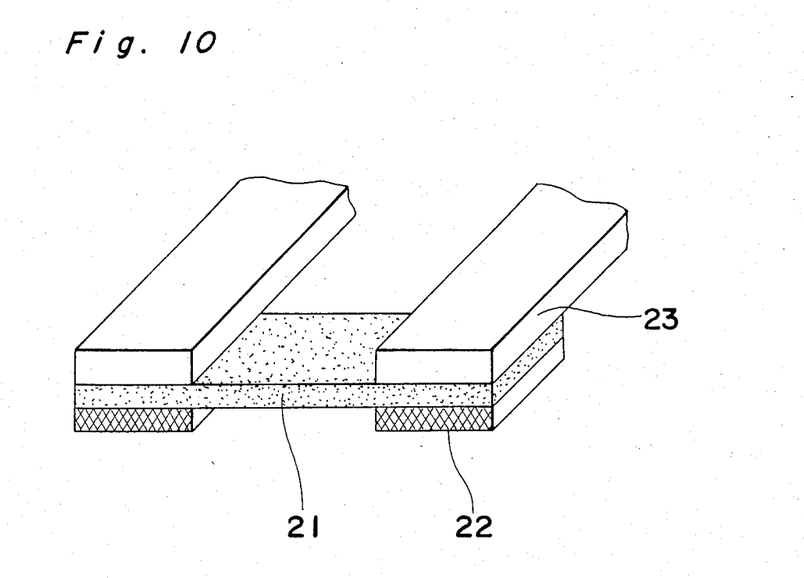
FIG. 10 is a perspective view showing another embodiment of the present invention.
Figure 11A:
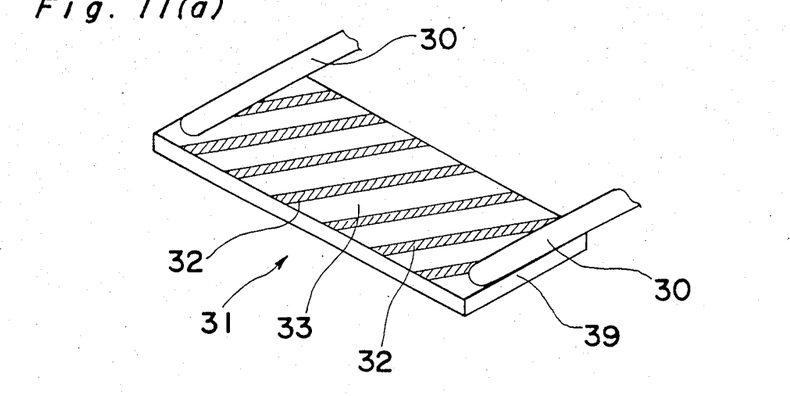
FIG. 11(a) is a perspective view, of a thin film magnetic head according to a further embodiment of the present invention.
Figure 11B:
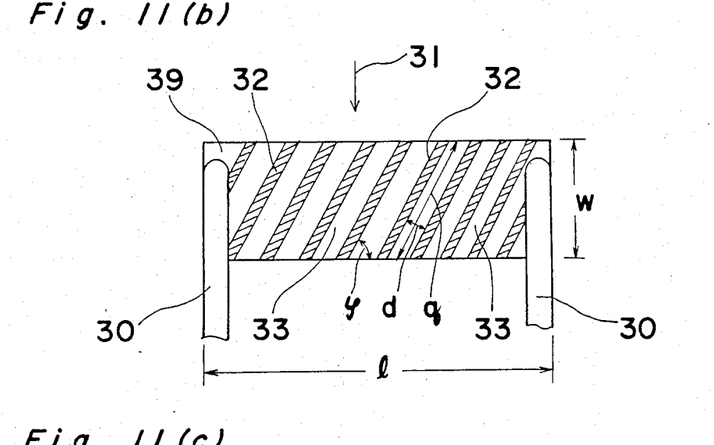
FIG. 11(b) is a plane view thereof.
Figure 11C:
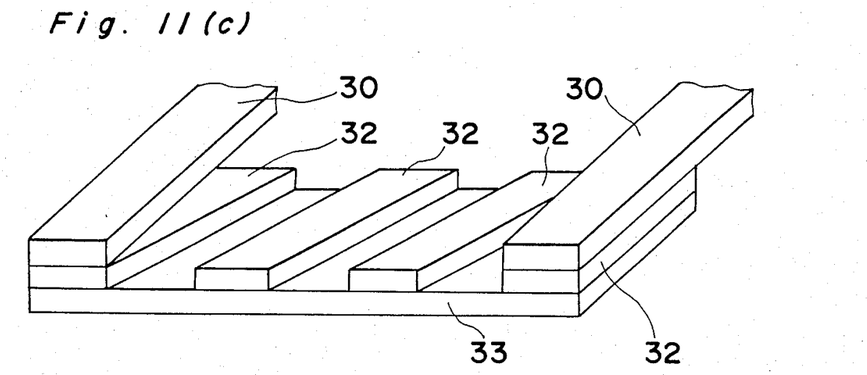
FIG. 11(c) is a perspective view showing a still further embodiment of the present invention.

The case where a ferromagnetic thin film, which is large in coercive force, has been disposed between the lead and the MR element, will now be described hereinabove. And, a similar effect can be produced under the construction wherein the MR element 21 and the ferromagnetic thin film 22, which is large in coercive force, have been reversed with respect to the lead 23 as shown in FIG. 10. Also, although the shield model of MR head has been described in detail, the present invention can be applied to the barber pole type MR head, the yoke type MR head, the non-shield type MR head, and furthermore a magnetic sensor using the magnetoresistive effect of the ferromagnetic thin film. According to the head construction of the present invention, the MR head can be realized, which is superior in S/N ratio through suppressing of the Barkhausen-jump.

In the embodiment shown in FIGS. 11 to 13, 39 is permalloy thin film (magnetoresistive element) of Ni 81%·Fe 19%, having film thickness of 500 Å. 10 is a lead for current feed use. The CoP electrodeposition film 32 of 500 to 700 Oe in coercive force is coated on the permalloy thin film 39 to 1000 Å in thickness. As shown in the same drawing, the shape of the CoP electrodeposition film 32 is formed as stripe-shaped patterns in the oblique direction (an angle $\psi$ is approximately 30° to 60°) with respect to the longitudinal direction of the rectangular permalloy thin film 39 shown therein. 31 is a signal magnetic applying direction. As described hereinabove, magnetic coupling force (which is called ferromagnetic exchange coupling) for causing the mutual magnetization to become parallel is caused in the location where the CoP electrodeposition film 32 is directly deposited on the permalloy thin film 39 as described hereinabove into composite film so that the composite film collectively works as one high coercive-force magnetic thin film. The location of the composite film of the embodiment becomes a hard film of 200 to 500 Oe in coercive force. Accordingly, the magnetization of the location of the composite film does not change if the signal magnetic field is given. Also, the shape of the exposed location 33 (hereinafter referred to as MR segment) of the permalloy thin film 39 is made sufficiently smaller than 1 in the ratio d/q (the value corresponds to the aspect ratio) wherein d is the width and q is the segment length. In the case of the embodiment, when the width d of the MR segment 33 is assumed approximately 1 $\mu$m when track width l=50 $\mu$m, element width w=10$\mu$m, the ratio becomes d/q<0.1 and becomes sufficiently smaller than 1. The magnetic domain becomes hard to split in the MR segment 13 and works as the single magnetic domain on condition that the aspect ratio of the MR segment is sufficiently smaller than 1. Also, the location where the film has become composite between the MR segment 33 and the MR segment 33 exists, but the location of the composite film becomes a hard magnetic thin film. Thus, each of the MR segments 33 . . . operate respectively as independent soft magnetic thin films. To provide the linear response characteristics is well known, a bias magnetic field has been applied, because in the thin film magnetic head, the resistance change in the magnetoresistive element is proportional to the square of the inner product of the magnetization vector and the sense current vector. In the thin film magnetic head in the above-described embodiment, the bias magnetic field is applied upon the MR segments 33 by the above-described composite film. The linear response characteristics are provided by the bias magnetic field.

Then, two magnetizing methods with respect to the composite film will be described hereinafter.

Figures 12A, 12B:
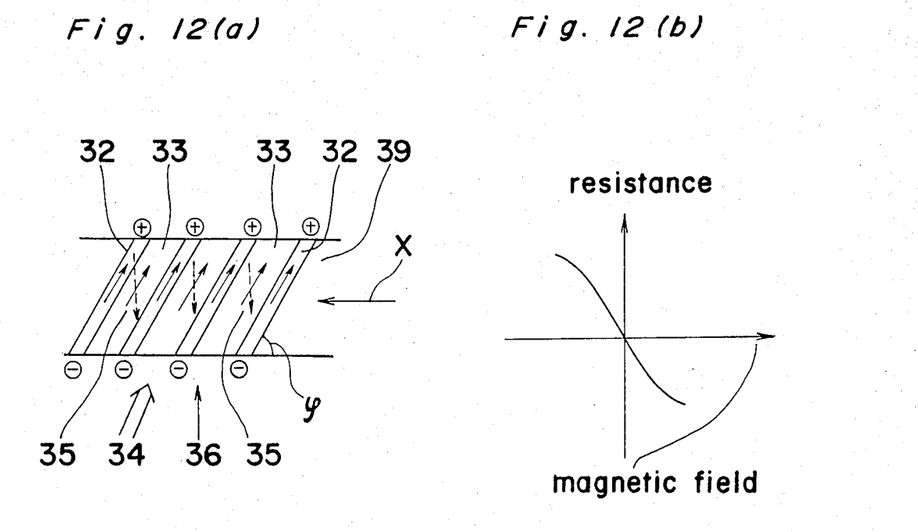
FIG. 12(a) is an explanatory view showing a first magnetizing method with respect to the composite film.
FIG. 12(b) is a graph showing the magnetic field-reluctance change curve of the thin film magnetic head.

The first magnetizing method with respect to the above-described composite film is shown in FIG. 12(a). Referring to FIG. 12(a), 39 is a permalloy thin film, 32 is a CoP electrodeposition film, and 33 is an MR segment. The composite film between the permalloy thin film 39 and the electrodeposition film 32 constitutes a stripe shape of an angle $\psi$ of approximately 30° to 60°. The magnetizing direction with respect to the composite film is a direction of the arrow 34, i.e., a parallel direction with respect to the stripe. The magnetization is performed by the application of an external magnetic field, which is larger than the coercive force of the composite film. At this time, the plus and minus of the magnetic charges and ($\oplus$ and $\ominus$ in FIG. 12) is caused at the tip of the composite film, which in turn magnetization along the direction of the broken-line arrow 35 is caused by the magnetic charges $\oplus$ and $\ominus$ so that the magnetization of the MR segment 33 may be interfered with by the magnetic field so caused. Thus, the width of the composite film (the width of the CoP electrodeposition film 12) is required to be made sufficiently smaller than the MR segment 13.

In the above-described thin film magnetic head, as the angle between the magnetization within the MR segment 33 and the sense current 37 becomes closer to 90° when the signal magnetic field in the positive direction from the direction of the arrow 36, the resistance decreases, whereas as the angle between the magnetization within the MR segment 33 and the sense current 37 becomes closer to 180° when the signal magnetic field is applied in the negative direction, the resistance increases. The magnetic field - magneto-resistance variation curve of the thin film magnetic head is shown in FIG. 12(b). As shown in FIG. 12(b), the magnetic field - magneto-resistance change curve shows the linear response characteristics.

Figure 13A:
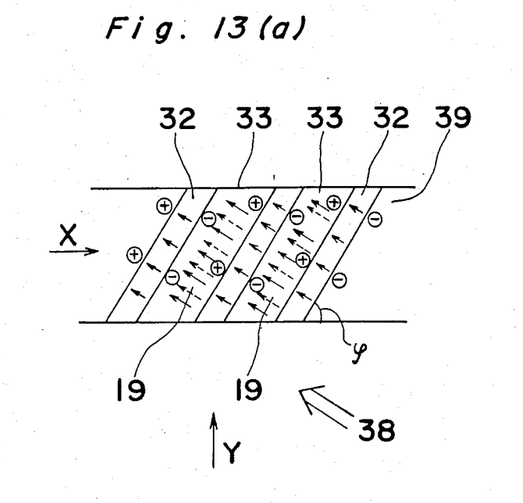
FIG. 13(a) is an explanatory view showing the second magnetizing method with respect to the composite film.

Also, FIG. 13(a) illustrates the second magnetizing method with respect to the composite film. In FIG. 13(a), the construction is similar to that of FIG. 12(a). The magnetizing direction with respect to the composite film is a direction shown by the arrow 38, i.e., a direction of an angle, which forms a supplementary angle with respect to the angle $\psi$ (approximately 45° to 60°) of the composite film. The external magnetic field, which is larger than the coercive force of the composite film is applied at this angle. At this time, the plus and minus magnetic charges $\oplus$ and $\ominus$ ($\oplus$ and $\ominus$ in FIG. 13) is caused in the edge portion of the composite film. The magnetic field shown by the broken-line arrow 39 is caused in the same direction as the magnetizing direction of the composite film, by the magnetic charges $\oplus$ and $\ominus$. The magnetic field operates as the bias magnetic field with respect to the MR segment 33. According to the second direction, there is no risk of being disturbed in the magnetization of the MR segment 33 by the magnetic field 19 produced through the magnetic charges $\oplus$ and $\ominus$ of the edge portion of the composite film.

Figure 13B:
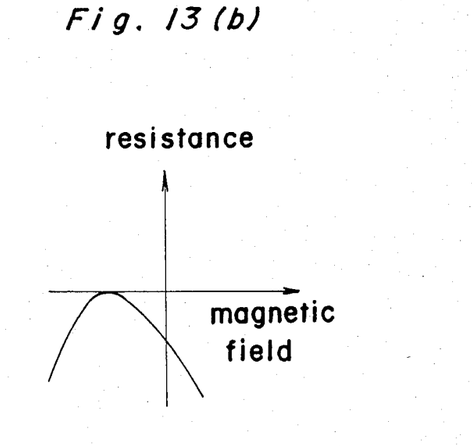
FIG. 13(b) is a graph showing the magnetoresistive change curve of the thin film magnetic head.

When the signal magnetic field is applied upon the positive direction from the direction of the arrow Y in the above-described thin film magnetic head, the angle between the magnetization within the MR segment 33 and the sense current approaches 90° so that the magneto-resistance of the MR segment decreases. When the signal magnetic field is applied in the negative direction, the angle between the magnetization within the MR segment 33 and the sense current approaches 180° to increase the magneto-resistance of the MR segment. The magnetic field-magneto-resistance change curve of the thin film magnetic head is shown in FIG. 13(b). As shown, the magnetic field-magneto-resistance change curve shows the linear response characteristics near 0 in the signal magnetic field.

In the above-described embodiment, the CoP electrodeposition film 32 is formed on the permalloy thin film 39, but the CoP electrodeposition film 32 may be formed in construction below the permalloy thin film 39. According to the present invention, the thin film magnetic head can be provided, wherein the magnetic domain is hard to split and the Barkhausen noises are smaller.

Although the present invention, has fully been described in connection with the preferred embodiments thereof with reference to the accompanying drawings, it is to be noted that various changes and modifications are apparent to those skilled in the art. Such changes and modifications are to be construed as included within the scope of the present invention as defined by the appended claims unless they depart therefrom.

What is claimed is:

1. A thin film magnetic head for detecting, as a change in electric resistance, a change in signal magnetic field to be applied along the magnetization-hard-axis direction of an elongated metal ferromagnetic thin film (MR element) having uni-axis anisotropy, which comprises a ferromagnetic film, which is sufficiently larger in coercive force than said metal ferromagnetic thin film (MR element), said ferromagnetic film being exclusively magnetized along a longitudinal direction of said elongated MR element and arranged on a superposed portion between a lead conductor portion and said metal ferromagnetic thin film (MR element), said metal ferromagnetic thin film (MR element) being coupled in a ferromagnetic exchange interaction relationship with said ferromagnetic film to thereby increase the sensitivity of the head, while suppressing Barkhausen noise.

2. A thin film magnetic head as claimed in claim 1, wherein a plurality of band-shaped high coercive ferromagnetic thin films are deposited on the surface of a rectangular magnetoresistive element in parallel relation to each other so as to extend in a direction oblique to the longitudinal direction of the magnetoresistive element.

* * * * *